(12) United States Patent
Favaretto

(10) Patent No.: US 9,115,642 B2
(45) Date of Patent: Aug. 25, 2015

(54) TURBOCHARGER PROVIDED WITH AN ELECTRICAL MACHINE FOR A SUPERCHARGED INTERNAL COMBUSTION ENGINE

(71) Applicant: Ferrari S.p.A., Modena (IT)

(72) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 114 days.

(21) Appl. No.: 13/957,030

(22) Filed: Aug. 1, 2013

(65) Prior Publication Data
US 2014/0033706 A1 Feb. 6, 2014

(30) Foreign Application Priority Data

Aug. 2, 2012 (IT) .............................. BO2012A0425

(51) Int. Cl.
| | |
|---|---|
| F02B 33/44 | (2006.01) |
| F02B 37/10 | (2006.01) |
| F01N 5/04 | (2006.01) |
| F02B 39/10 | (2006.01) |
| H02K 51/00 | (2006.01) |
| H02K 7/14 | (2006.01) |

(52) U.S. Cl.
CPC . *F02B 37/10* (2013.01); *F01N 5/04* (2013.01); *F02B 39/10* (2013.01); *H02K 51/00* (2013.01); *H02K 7/14* (2013.01); *Y02T 10/144* (2013.01); *Y02T 10/16* (2013.01)

(58) Field of Classification Search
CPC ............ F01N 5/04; F02B 37/10; F02B 39/10; H02K 51/00; H02K 7/14; Y02T 10/144; Y02T 10/16

USPC ............................... 60/39.6–39.63, 597–624; 123/559.1–566, 200–249
See application file for complete search history.

(56) References Cited

U.S. PATENT DOCUMENTS

| | | | | |
|---|---|---|---|---|
| 5,074,115 | A | * | 12/1991 | Kawamura ...................... 60/608 |
| 7,649,292 | B2 | * | 1/2010 | Moriya et al. ................ 310/114 |
| 2006/0218923 | A1 | | 10/2006 | Sopko, Jr. et al. |
| 2009/0127956 | A1 | * | 5/2009 | Ozaki et al. ................... 310/90.5 |
| 2012/0119509 | A1 | * | 5/2012 | West ............................. 290/1 C |
| 2013/0205773 | A1 | * | 8/2013 | Persson et al. ............... 60/605.1 |

FOREIGN PATENT DOCUMENTS

| | | |
|---|---|---|
| DE | 102007025550 A1 | 12/2008 |
| EP | 2096277 A1 | 9/2009 |
| JP | 07-26972 A | 1/1995 |

OTHER PUBLICATIONS

"Italian Application Serial No. IT BO20120425, Search Report dated May 8, 2013", 7 pgs.

* cited by examiner

*Primary Examiner* — Jesse Bogue
(74) *Attorney, Agent, or Firm* — Schwegman Lundberg & Woessner, P.A.

(57) ABSTRACT

A turbocharger for a supercharged internal combustion engine; the turbocharger has: a turbine, which is provided with a shaft mounted in a rotatory manner; a compressor, which is provided with a shaft mounted in a rotatory manner and is mechanically independent from the shaft of the turbine; and a single electrical machine, which is interposed between the turbine and the compressor, and is provided with a first rotor, which is mechanically connected to the shaft of the turbine, and with a second rotor which is mechanically connected to the shaft of the compressor to work as an electromagnetic joint between the shaft of the turbine and the shaft of the compressor.

7 Claims, 8 Drawing Sheets

TURBOCHARGER PROVIDED WITH AN ELECTRICAL MACHINE FOR A SUPERCHARGED INTERNAL COMBUSTION ENGINE

RELATED APPLICATION

This application claims the benefit of priority, under U.S.C. Section 119, to Italian Patent Application Serial No. BO2012A 000425, filed Aug. 2, 2012, which is incorporated herein by reference in its entirety.

TECHNICAL FIELD

The present document relates to a turbocharger provided with an electrical machine for a supercharged internal combustion engine.

BACKGROUND

Some internal combustion engines are provided with a supercharging system with turbocharger which can increase the power developed by the engine by exploiting exhaust gas enthalpy for compressing the air aspirated by the engine, thus increasing volumetric intake efficiency. An approach to a supercharging system with turbocharger comprises a turbocharger provided with a single common shaft on which there are a turbine arranged along an exhaust duct to rotate at a high speed under the thrust of the exhaust gases expelled by the engine, and a compressor, which is rotated by the turbine and is arranged along the air intake duct to compress the air aspirated by the engine.

The dimensioning and the control mode of a turbocharger are always a trade-off between the needs of the compressor and the needs of the turbine, and between the need to contain the turbo lag and the need to supply a noticeable power increase; therefore, in most cases, neither pneumatic machine works under optimal conditions. Furthermore, the two pneumatic machines must be designed to work together (i.e. always at the same rpm); therefore, the two pneumatic machines cannot be optimized to maximize the respective efficiencies. In order to improve the operation of the turbocharger, it has been suggested to connect a reversible electrical machine to the turbocharger shaft, which reversible electrical machine may work either as an electrical motor to accelerate the compressor as soon as an increase of delivered power is requested, and thus without waiting for the effect of increasing volume and speed of the exhaust gases, or as an electrical generator for "regenerating" the part of mechanical power generated by the turbine and not used by the compressor.

Patent application US2006218923A1 describes an internal combustion engine 12 supercharged by means of a turbocharger 24 provided with a turbine and a compressor, both keyed onto a common shaft onto which an electrical machine 46 is also keyed to be used either as a motor to increase the rpm of the compressor (and thus to cancel out the so-called turbo lag) or as a generator to exploit exhaust gas enthalpy for generating electricity. Patent application US2006218923A1 describes an internal combustion engine 10 supercharged by means of a turbocharger provided with a turbine 22 and with a compressor 24 both keyed onto a common shaft onto which an electrical machine 32 is also keyed to be used either as a motor to increase the revolution speed of the compressor (and thus to cancel out the so-called turbo lag) or as a generator for exploiting the enthalpy of the exhaust gases for generating electricity, which is used to supply an electrical motor 34 keyed onto the drive shaft of the internal combustion engine 10. However, even in these solutions, compressor and turbine are angularly integral and thus always rotate at the same rpm; furthermore, connecting the electrical machine to a shaft of a turbocharger places some problems because the shaft of a turbocharger may rotate at very high speeds (up to 100,000 rpm), which are much higher (also by one order of size) than the rpm of a common electrical machine.

In order to overcome the aforesaid drawbacks, patent application EP2096277A1 describes a turbocharger comprising a turbine, which rotates an electrical generator, and a compressor, which is mechanically independent from the turbine and rotated by an electrical motor. However, the use of two mechanically independent electrical machines considerably increase the weight and dimensions of the turbocharger because each electrical machine must be able to continuously deliver/draw a power equal to the nominal power of the turbocharger. Furthermore, the operating efficiency of the turbocharger is relatively modest because the mechanical power is transferred from the turbine to the compressor by adding up the power losses of the electrical machine (and of the corresponding electronic control device), the power losses of the electrical motor (and of the corresponding electronic control device) and the power losses of the transmission line which connects the electrical generator to the electrical motor.

Patent application JPH0726972 (corresponding to patent JP3386559B2), in the embodiments shown in FIGS. 13, 15 and 16, describes a turbocharger comprising: a turbine 28, which is provided with a shaft 38 mounted in a rotatory manner and connectable to an exhaust duct so as to rotate under the thrust of the exhaust gases; a compressor 26, which is provided with a shaft 36 mounted in a rotatory manner and connectable to an intake duct to increase the pressure of the air fed by the intake duct; and a single electrical machine 136, which is interposed between turbine 28 and compressor 26. The shaft 38 of the 28 and the shaft 36 of compressor 26 are mechanically independent since they do not have any mutual mechanical connection and are thus free to freely rotate with respect to each other. Furthermore, the electrical machine 136 comprises a first rotor 138, which is mechanically connected to the shaft 38 of turbine 28, and a second rotor 137, which is mechanically connected to the shaft 36 of compressor 26 to work as an electromagnetic joint between the shaft 38 of turbine 28 and the shaft 36 of compressor 26. However, the turbocharger described in patent application JPH0726972 has some drawbacks because it is rather large and, above all, the control of the two rotors is complex; i.e. controlling the two rotors independently by means of a common stator is rather complex.

OVERVIEW

The present invention can provide a turbocharger provided with electrical machine for a supercharged internal combustion engine, which is easy and cost-effective to be implemented and free from the aforesaid drawbacks.

According to an embodiment of the present invention, a turbocharger equipped with an electrical machine for an internal combustion engine is provided as claimed in the appended claims.

BRIEF DESCRIPTION OF THE DRAWINGS

Embodiments of the present invention will now be described with reference to the accompanying drawings, which illustrate some non-limitative embodiments thereof, in which.

DETAILED DESCRIPTION

Figure 1:
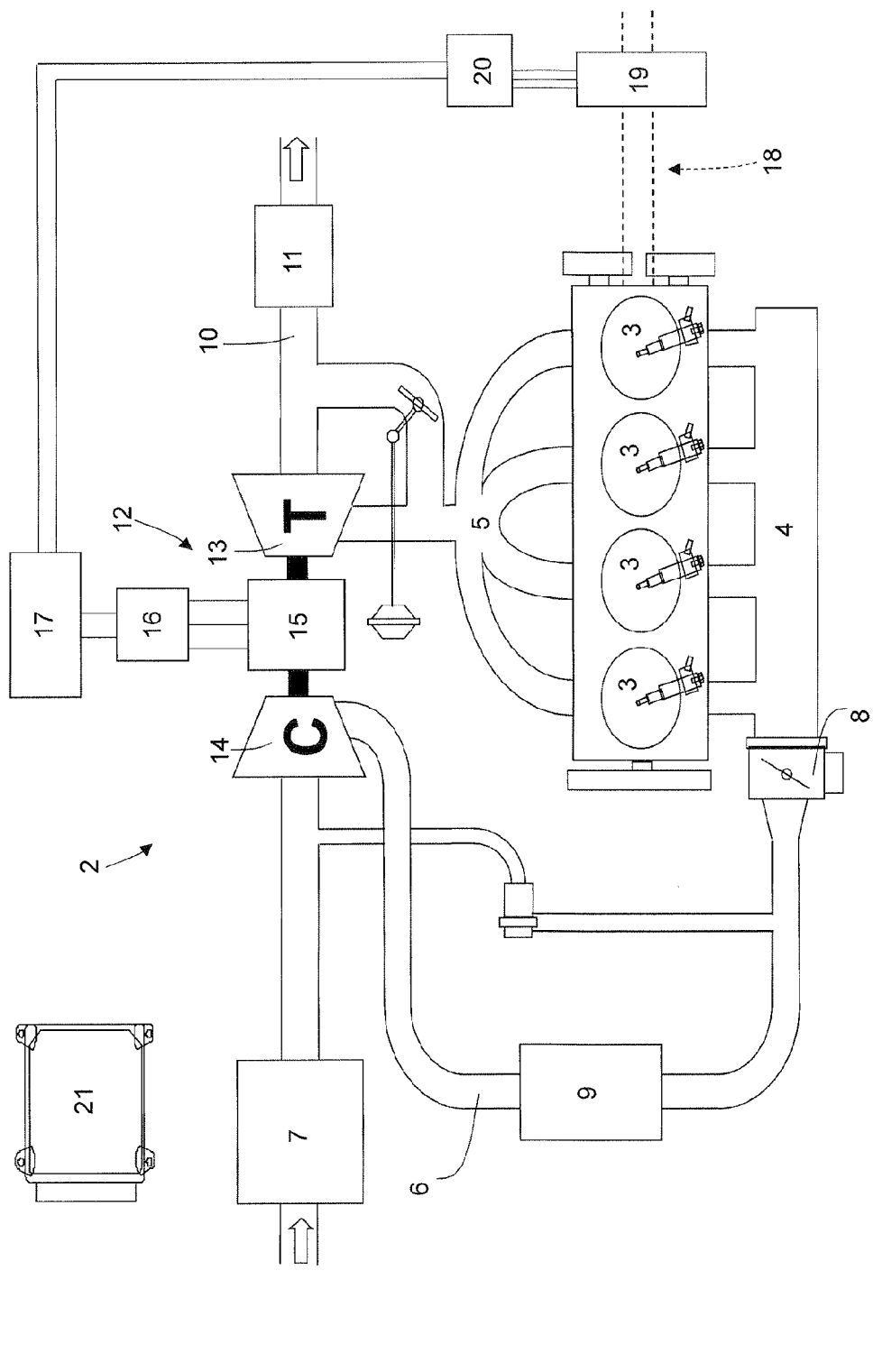
FIG. 1 is a diagrammatic view of a supercharged internal combustion engine comprising a turbocharger which is provided with an electrical machine.

In FIG. 1, numeral 1 indicates as a whole an internal combustion engine supercharged by a supercharging system 2 with turbocharger.

The internal combustion engine 1 comprises four cylinders 3, each of which is connected to an intake manifold 4 by means of at least one respective intake valve (not shown) and to an exhaust manifold 5 by means of at least one respective exhaust valve (not shown). The intake manifold 4 receives fresh air (i.e. air coming from the external environment) through an intake duct 6, which is provided with an air cleaner 7 and is adjusted by a throttle valve 8. An intercooler 9 for cooling the intake air is arranged along the intake duct 6. An exhaust duct 10, which feeds the exhaust gases produced by combustion to an exhaust system, is connected to the exhaust manifold 5, which exhaust duct emits the gases produced by the combustion into the atmosphere, and normally comprises at least one catalyzer 11 and at least one silencer (not shown) arranged downstream of catalyzer 11.

The supercharging system 2 of the internal combustion engine 1 comprises a turbocharger 12 provided with a turbine 13, which is arranged along the exhaust duct 10 in order to rotate at high speed under the thrust of the exhaust gases expelled from the cylinders 3, and a compressor 14, which is arranged along the intake duct 6 to increase the pressure of the air fed from the intake duct 6. Furthermore, turbocharger 12 comprises an electrical machine 15 which, according to the following modes described in greater detail below, is mechanically interposed between turbine 13 and compressor 14. The electrical machine 15 is electrically connected to an electronic control device 16, which is, in turn, connected to an electricity storage system 17, normally consisting of a pack of electrochemical batteries.

The drive shaft of the internal combustion engine 1 is connected to a drive line 18 which transmits the torque generated by the internal combustion engine 1 to one of the drive wheels of a vehicle. The drive line 18 is provided with a reversible electrical machine 19, which may be operated either as an electrical motor to draw electric current and produce mechanical torque, or as a generator to draw mechanical energy and produce electricity. The electrical machine 19 is electrically connected to an electronic control device 20 connected, in turn, to the storage system 17.

The internal combustion engine 1 is controlled by an electronic control unit 21, which governs the operation of all the components of the internal combustion engine 1 including the supercharging system 2 (i.e. the electronic control unit 21 controls the electrical machine 15 of turbocharger 12).

Figure 2:
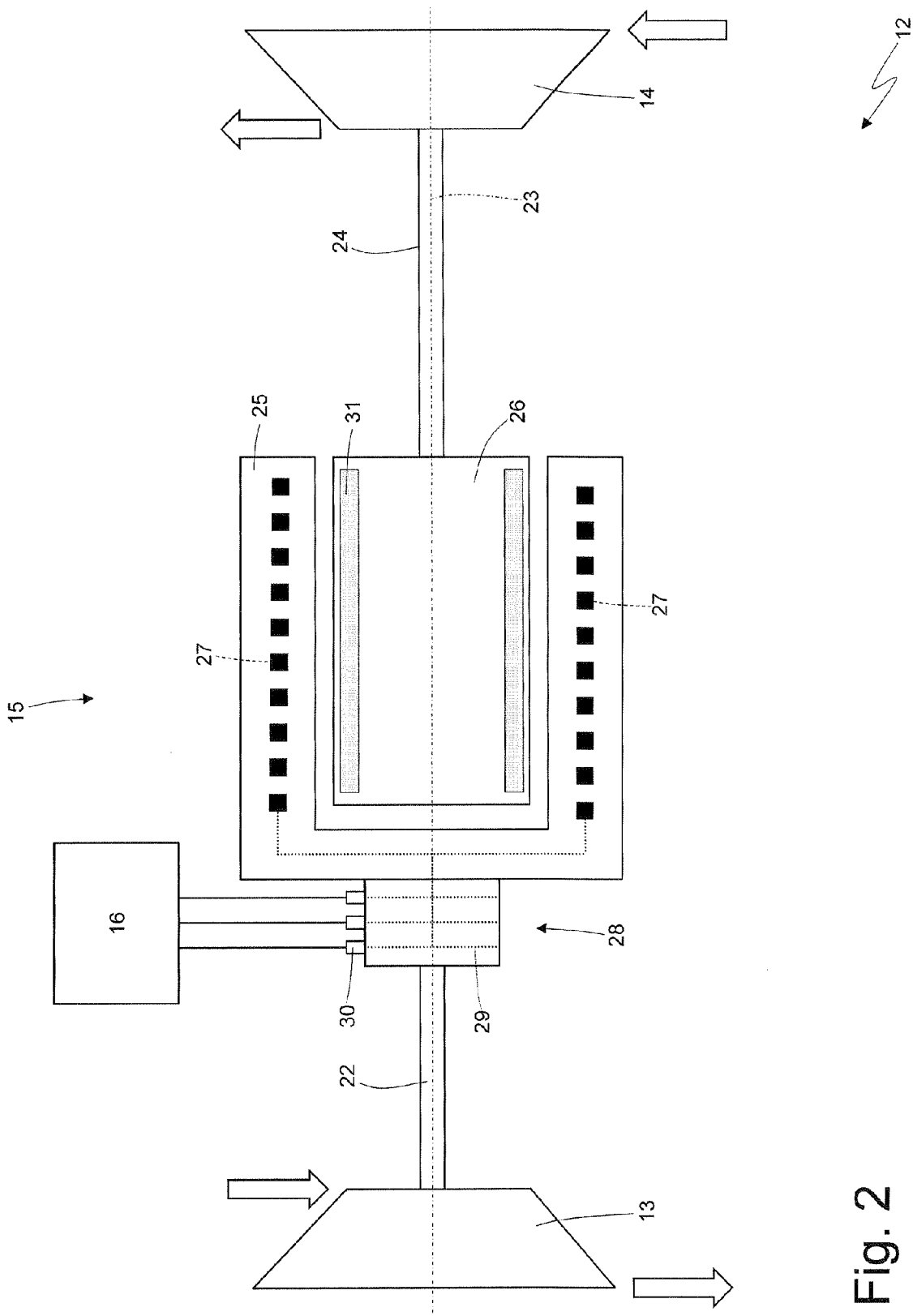
FIG. 2 is a diagrammatic view of the turbocharger made according to an embodiment of the present invention.

As shown in FIG. 2, turbine 13 comprises a shaft 22 which supports the impeller of turbine 13 and is mounted in a rotatory manner to rotate about a rotation axis 23. Similarly, compressor 14 comprises a shaft 24 which supports the impeller of compressor 14 and is mounted in a rotatory manner to rotate about the rotation axis 23. The shaft 22 of turbine 13 and the shaft 24 of compressor 14 are coaxial (i.e. both rotate about the same rotation axis 23) and are mechanically independent, since they do not have any mutual mechanical connection and are thus free to freely rotate with respect to each other. The electrical machine 15 comprises a rotor 25 which is mounted in a rotatory manner about the rotation axis 22 and is mechanically connected to the shaft 22 of turbine 13, and a rotor 26 which is mounted in a rotatory manner about the rotation axis 22 and is mechanically connected to the shaft 24 of compressor 14.

Rotor 25 comprises a winding 27 which is electrically fed by the electronic control device 16 with a system of multi-phase (typically three-phase) currents to generate a rotating magnetic field which concatenates with rotor 26 to generate an electromagnetic interaction between the two rotors 25 and 26. In order to provide an electric connection between the electronic control device 16 (which is fixed) and the winding 27 (which rotates), rotor 25 is provided with a connection device 28 which establishes the electrical connection between a fixed part and a rotating part. By way of example, the connection device 28 comprises a plurality of conductor rings 29 (three, in the case of three-phase windings 27), which are mutually electrically insulated, are connected to winding 27 and are integral with rotor 25 to rotate with the rotor 25, and a corresponding plurality of brushes 30, which are fixed and are pressed against the conductor rings 29 to slide about the rings of the conductors 29 themselves.

Preferably, rotor 26 is of the permanent magnet type, and comprises a plurality of corresponding magnetic poles (thus the electrical machine 15 is of the synchronous type with alternating current). The magnetic field generated by the permanent magnets 31 of rotor 26 interacts with the rotating magnetic field generated by the winding 27 of rotor 25 to establish an electromagnetic interaction between the two rotors 25 and 26.

In use, the electronic control device 16 feeds a system of multi-phase (typically three-phase) currents in winding 27 by means of the connection device 28 to vary the electromagnetic interaction modes between the two rotors 25 and 26. The main function of the electrical machine 15 is to form an electromagnetic joint between the shaft 22 of turbine 13 and the shaft 24 of compressor 14, in order to transfer the torque generated by turbine 13 to compressor 14 so as to actuate the compressor 14 by means of the thrust of exhaust gases which flow through turbine 13. The electrical machine 15 may work as an electromagnetic joint (i.e. transferring torque from the shaft 22 of turbine 13 to the shaft 24 of compressor 14) without exchanging power with the turbine 13 and/or the compressor 14; i.e. the electrical machine 15 always draws the active electrical power needed to compensate for electrical power losses but essentially employs reactive electrical power.

An essential feature of the electrical machine 15 is that the shaft 22 of turbine 13 rotates at a different speed from the shaft 24 of compressor 14; thereby, it is possible to attempt to optimize the operation of turbine 13 independently from the attempt to optimize the operation of compressor 14. In other words, the rotation of compressor 14 is controlled with the sole objective of optimizing the intake of the cylinders 3 according to the required performance (i.e. torque and power that the internal combustion engine 1 must deliver), and the rotation of turbine 13 is controlled with the sole objective of optimizing the generation of electricity, i.e. to maximize the generated power without impairing the operation of the internal combustion engine 1. The difference between the rotation speed of the shaft 22 of turbine 13 and the rotation speed of the shaft 24 of compressor 14 is equal to the relative rotation speed between rotor 25 and rotor 26, i.e. is directly proportional to the frequency of the system of multi-phase currents which is fed in winding 27: by varying the frequency of the system of multi-phase (typically three-phase) currents which is fed in winding 27, the rotation speed of the shaft 22 of turbine 13 and the rotation speed of the shaft 24 of compressor 14 vary (i.e. are adjusted) as a consequence.

Besides working as an electromagnetic joint (i.e. transferring torque from the shaft 22 of turbine 13 to the shaft 24 of compressor 14), the electrical machine 15 may also work as an electrical generator to convert (regenerate) part of the mechanical power supplied by turbine 13 into electricity which is used by other electrical devices in the vehicle (such as the electrical machine 19 as well) and/or is stored in the storage system 18; in other words, the mechanical power supplied by turbine 13 is transferred in part to compressor 14 and the remaining part is converted (regenerated) into electricity by the electrical machine 15. Obviously, this operating mode is used when turbine 13 generates an excess of mechanical power with respect to the needs of compressor 14, typically when the ratio of the internal combustion engine 1 is stationary at high rpm (thereby, it is possible to considerably increase the overall energy efficiency of turbocharger 12).

Besides working as an electromagnetic joint (i.e. transferring torque from the shaft 22 of turbine 13 to the shaft 24 of compressor 14), the electrical machine 15 may also work as an electrical motor to supply mechanical power to compressor 14; in other words, the mechanical power generated by the electrical machine 15 is added to the power supplied by turbine 13. Obviously, this operating mode is used when turbine 13 generates less mechanical power than that needed by compressor 14, typically when the internal combustion engine 1 is at low rpm and must accelerate rapidly (thereby, the turbo lag of turbocharger 12 can be cancelled out).

In the embodiment shown in FIG. 2, the electrical machine 15 does not include any stator (because winding is carried by rotor 25) and rotor 26 is inserted within rotor 25, which is cup-shaped (i.e. the two rotors 25 and 26 are inserted into each other). In this embodiment, the winding 27 (i.e. the active conductors of winding 27) and the permanent magnets 31 are arranged parallel to the rotation axis 23.

Figure 3:
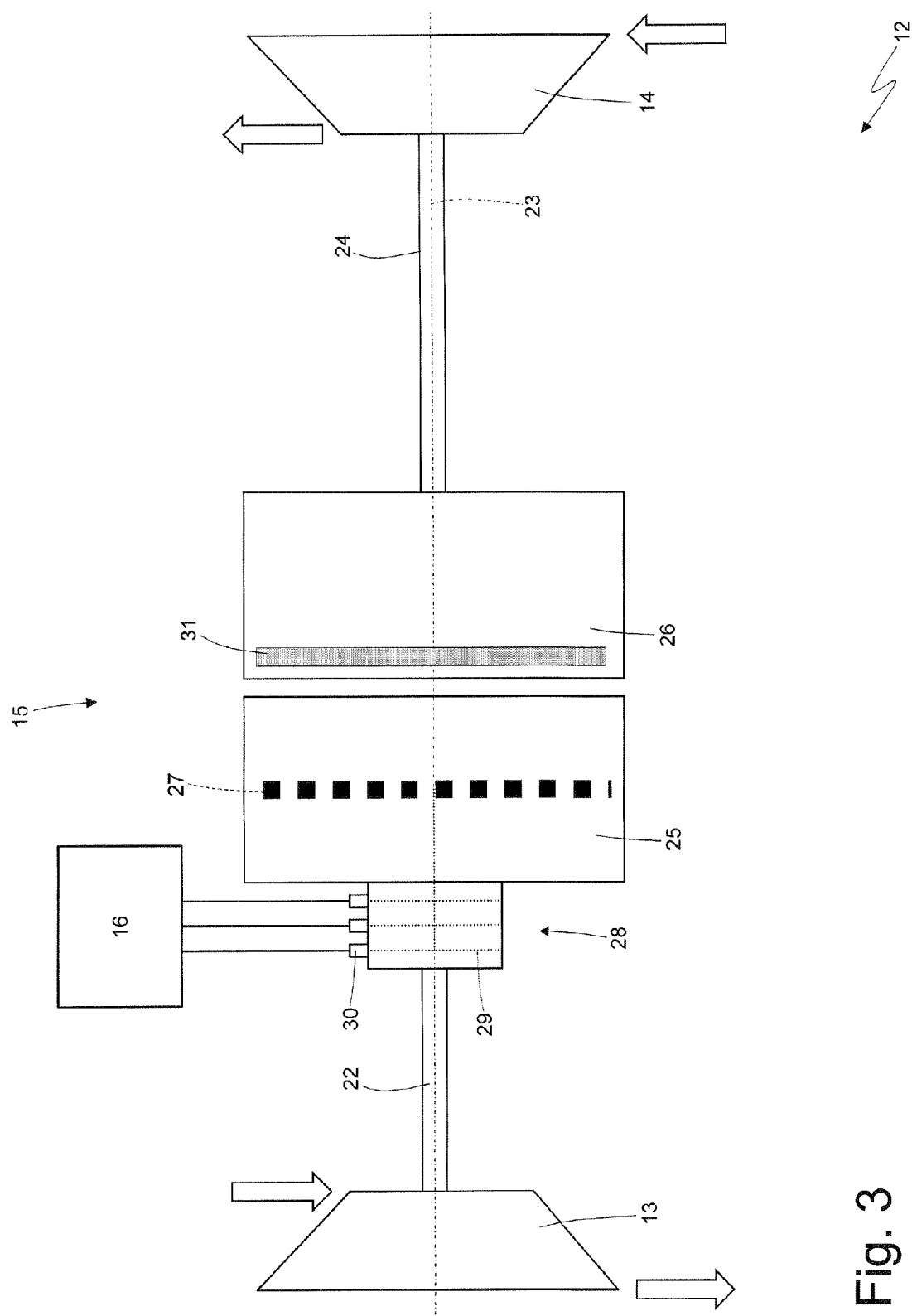
FIGS. 3 and 8 are two diagrammatic views of different corresponding embodiments of the turbocharger in FIG. 1 made in accordance with an embodiment of the present invention.

The alternative embodiment shown in FIG. 3 is similar to the embodiment shown in FIG. 2, which differs in that the two rotors 25 and 26 are not inserted within each other, but are arranged side by side. In this embodiment, the winding 27 (i.e. the active conductors of winding 27) and the permanent magnets 31 are arranged parallel to the rotation axis 23.

It is worth noting that in the various embodiments shown in FIGS. 2 and 3 the relative rotation speed between the winding 27 carried by rotor 25 and the permanent magnets 31 carried by rotor 26 may be relatively low (if compared with the absolute rotation speed of the two rotors 25 and 26), because both rotors 25 and 26 rotate together in the same direction (but at different rotation speeds). Therefore, the control of the system of multi-phase (typically three-phase) currents that crosses winding 27 is facilitated because the frequency which is needed for control (which depends on the relative rotation speed between the two rotors 25 and 26) is relatively low (if compared with the absolute rotation speed of the two rotors 25 and 26).

Figure 4:
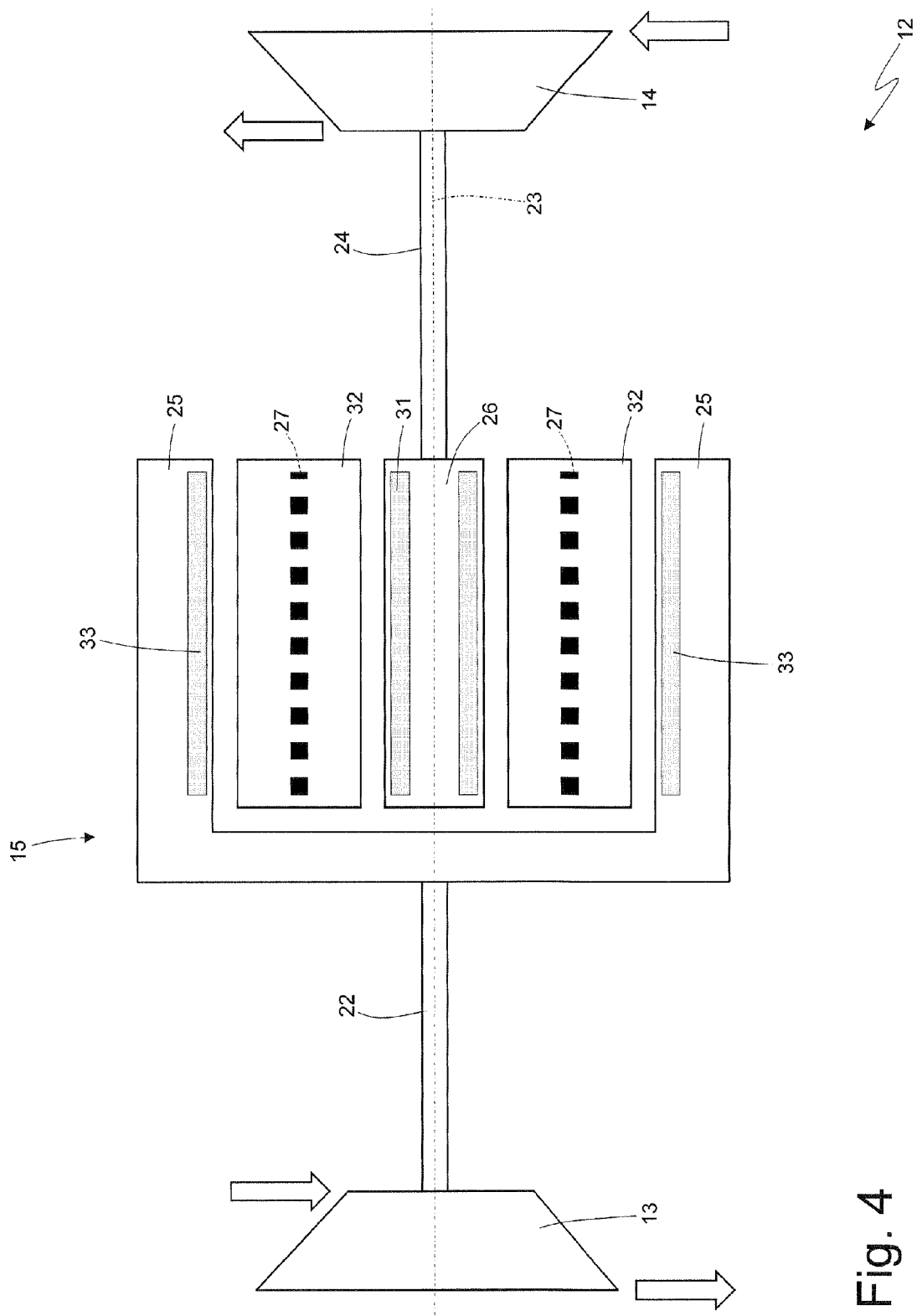
FIGS. 4-7 are diagrammatic views of further corresponding embodiments of the turbocharger in FIG. 1.

In an embodiment shown in FIG. 4, the electrical machine 15 comprises a stator 32, which supports the winding 27 (and therefore the connection device 28 is no longer present), and the rotor 25 is of the permanent magnet type and comprises a plurality of permanent magnets 33 which form corresponding magnetic poles. Also in the embodiment shown in FIG. 4, rotor 26 is inserted within rotor 25 (i.e. the two rotors 25 and 26 are inserted into each other). Furthermore, in the embodiment shown in FIG. 4, stator 32 is interposed between rotor 26 and rotor 25, i.e. stator 32 surrounds rotor 26 and is surrounded by rotor 25. In this embodiment, the winding 27 (i.e. the active conductors of winding 27) and the permanent magnets 31 and 33 are arranged parallel to the rotation axis 23.

Figure 5:
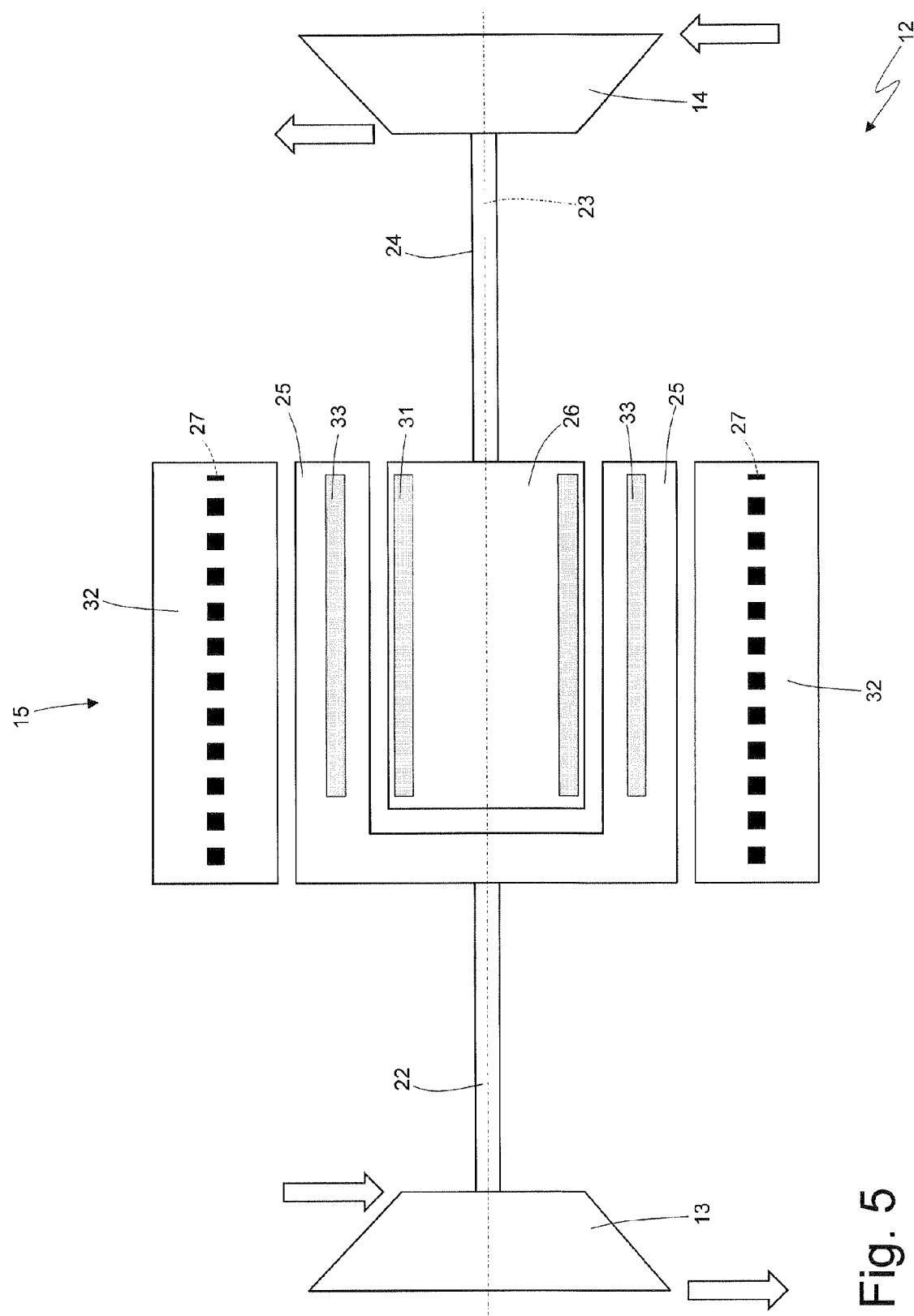

The alternative embodiment shown in FIG. 5 is similar to the embodiment shown in FIG. 4 from which it differs in that stator 32 is arranged outside rotor 25, i.e. surrounds both rotor 26 and rotor 25. In this embodiment, the winding 27 (i.e. the active conductors of winding 27) and the permanent magnets 31 and 33 are arranged parallel to the rotation axis 23.

Figure 6:
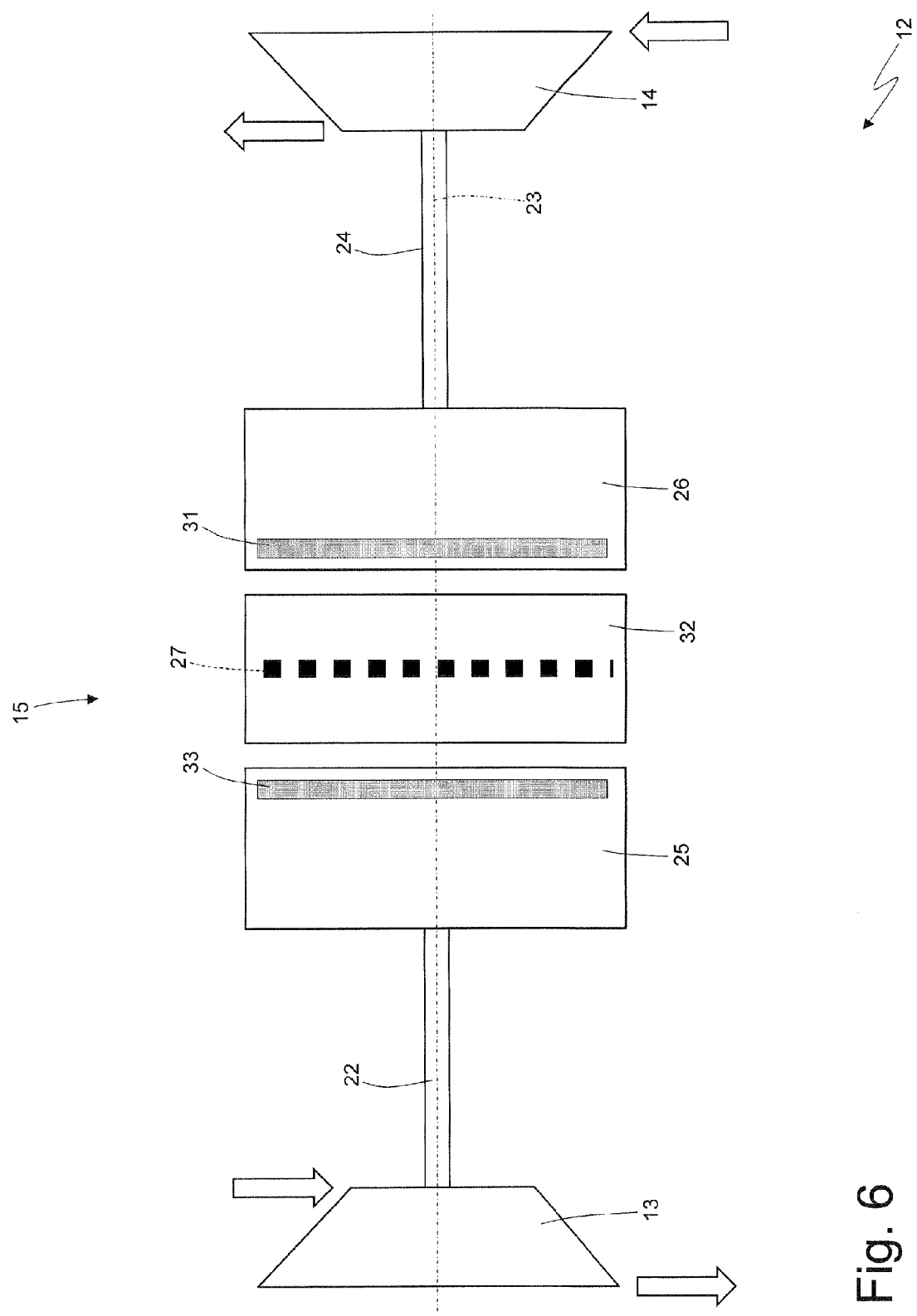

The embodiment shown in FIG. 6 is similar to the embodiment shown in FIG. 4 from which it differs in that the two rotors 25 and 26 are not inserted within each other, but are arranged side by side with the interposition of stator 32. In this embodiment, the winding 27 (i.e. the active conductors of winding 27) and the permanent magnets 31 and 33 are arranged perpendicularly to the rotation axis 23.

Figure 7:
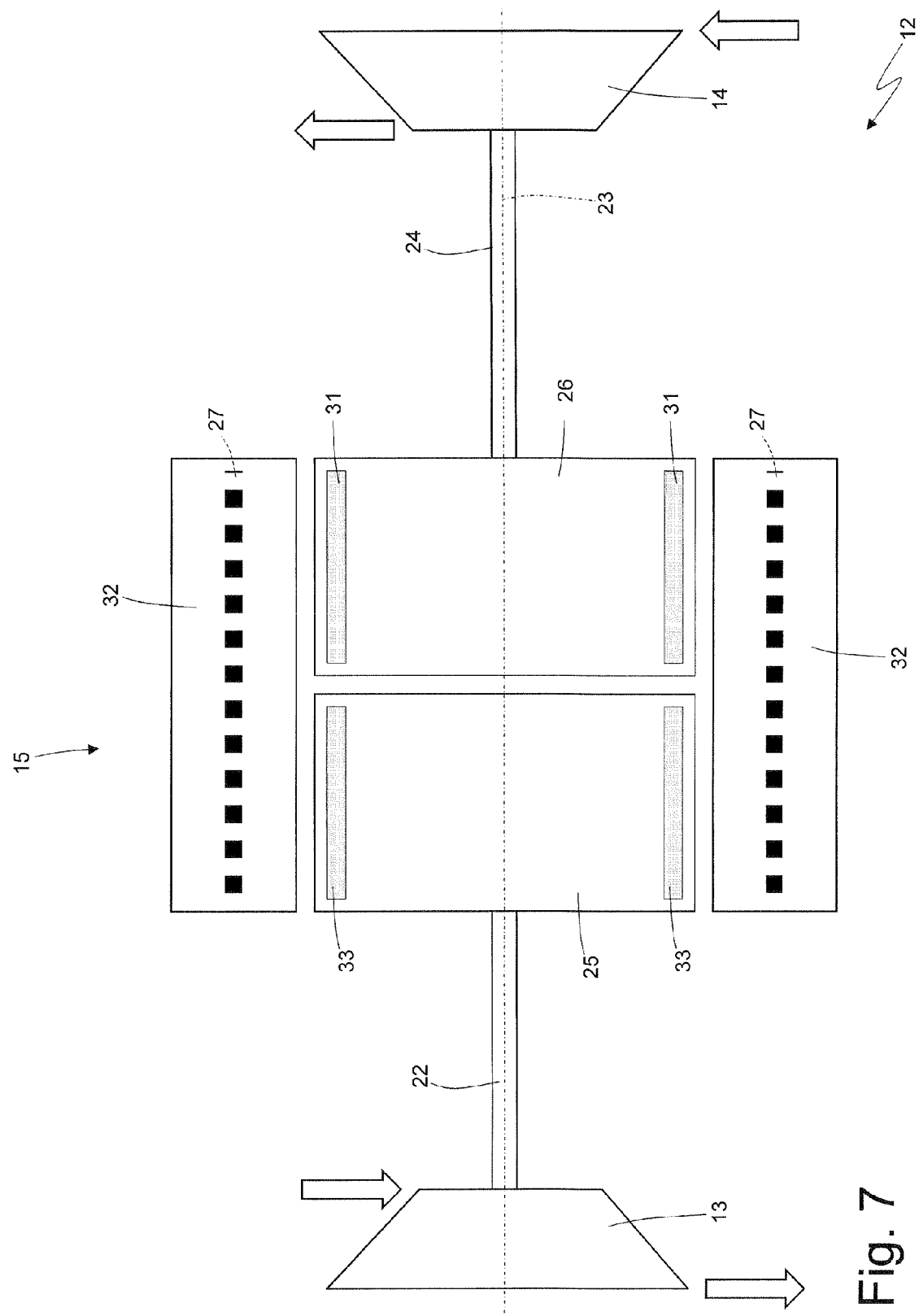

The alternative embodiment shown in FIG. 7 is similar to the embodiment shown in FIG. 4 from which differs in that the two rotors 25 and 26 are not inserted into each other, but are arranged side by side and are both surrounded by stator 32. In this embodiment, the winding 27 (i.e. the active conductors of winding 27) and the permanent magnets 31 and 33 are arranged parallel to the rotation axis 23.

Figure 8:
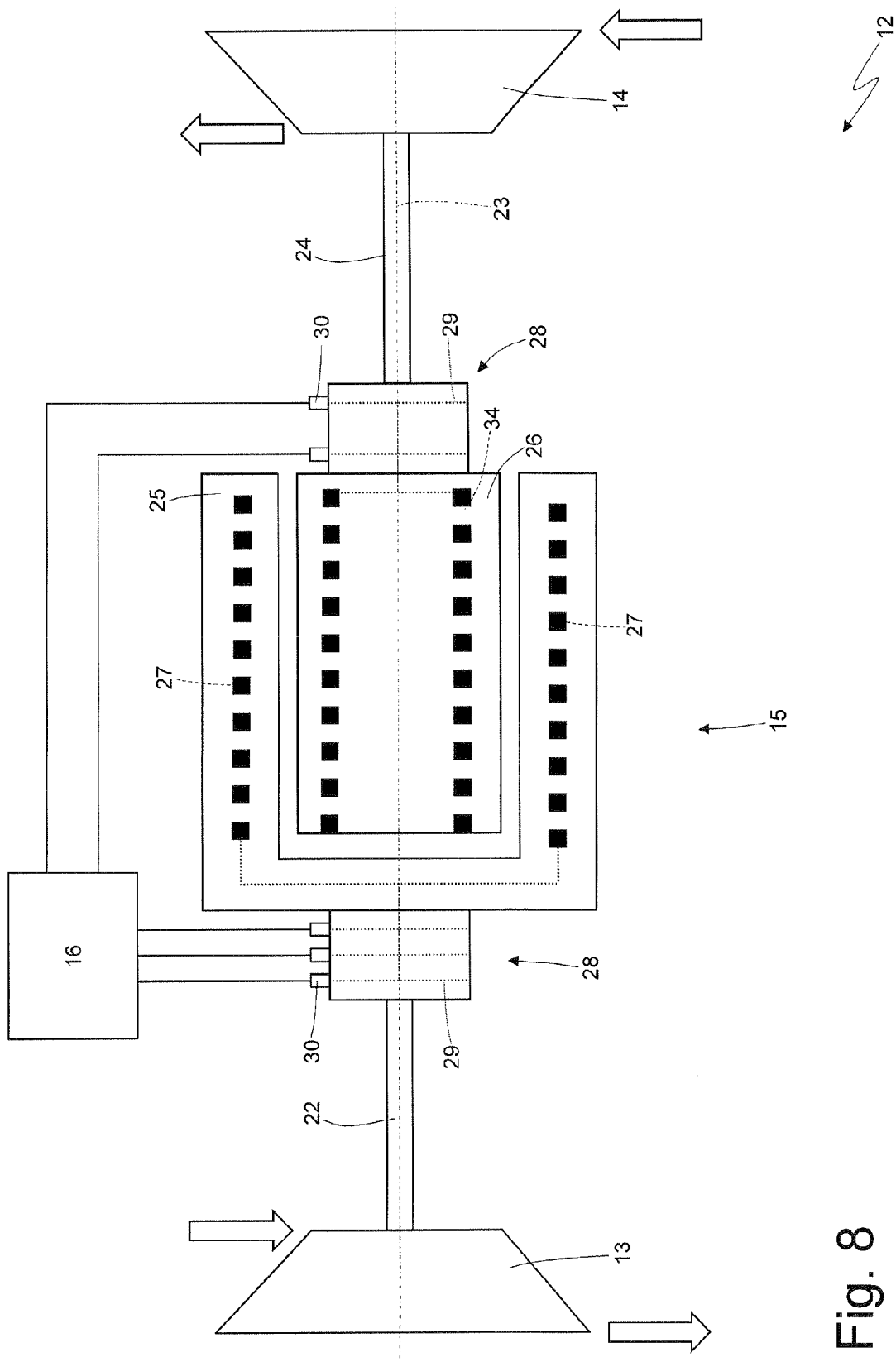

In the embodiments shown in FIGS. 2-7, the electrical machine 15 is of the synchronous, permanent magnet type, and thus rotor 26 is provided with permanent magnets 31 (embodiments shown in FIGS. 2 and 3), or both rotors 25 and 26 are provided with permanent magnets 33 and 31 (embodiments shown in FIGS. 4-7). In the alternative embodiment shown in FIG. 8, the electrical machine 15 is again of the synchronous type and the permanent magnets of rotor 26 are replaced by a further direct current winding 34, which forms an electromagnet and is fed by the electronic control device 16 by means of a further connection device 28; obviously, the permanent magnets 33 of rotor 25 could be replaced by a further direct current winding 34 which forms an electromagnet. Alternatively, the electrical machine 15 is of the variable reluctance type and therefore no rotor 25 or 26 is provided with permanent magnets 33 or 31 or electromagnets (which are replaced by a particular shape of the ferromagnetic core). Alternatively, the electrical machine 15 is of the asynchronous type, and therefore no rotor 25 or 26 is provided with permanent magnets 33 or 31 or electromagnets (which are replaced by squirrel cages).

The shaft 22 of turbine 13 and the shaft 24 of compressor 14 (i.e. the two rotors 25 and 26) generally rotate in the same direction (typically at respective different rotation speeds); however, the shaft 22 of turbine 13 and the shaft 24 of compressor 14 (i.e. the two rotors 25 and 26) could also rotate in opposite directions (typically with respective rotation speeds having different absolute values).

In the embodiments shown in the accompanying figures, turbine 13 and compressor 14 have a (radial) centrifugal shape of the traditional type (in which the fluid flows being either compressed or expanded perpendicularly to the rotation axis); according to an alternative embodiment, turbine 13 and/or compressor 14 could have an axial shape (in which the fluid flows being either compressed or expanded parallel to the rotation axis) which allows to obtain higher efficiency. The use of a turbine 13 and/or of a compressor 14 having an axial shape is allowed because there is no mechanical connection between the shaft 22 of turbine 13 and the shaft 24 of compressor 14, and thus the shaft 22 of turbine 13 and the shaft 24 of compressor 14 can rotate with differentiated rotation speed.

The above-described turbocharger 12 has many advantages.

Firstly, the above-described turbocharger 12 allows to eliminate the mechanical connection existing between the shaft 22 of turbine 13 and the shaft 24 of compressor 14, and thus allows to separate the control of turbine 13 from the control of compressor 14 and to optimize the performance of both turbine 13 and compressor 14. In particular, by virtue of the fact that turbine 13 and compressor 14 are not mechanically connected, both pneumatic machines may be designed to work at optimized revolution rates for their respective tasks without needing to take the needs of the other pneumatic machine into account.

Furthermore, the above-described turbocharger 12 is particularly light and compact because it comprises a single electrical machine 15 having a modest nominal power which creates an electromagnetic joint between the shaft 22 of turbine 13 and the shaft 24 of compressor 14. The electrical machine 15 has a modest nominal power because it must not draw/deliver all the nominal power of the turbocharger, but it must draw/deliver only the difference between the mechanical power supplied by turbine 13 and the mechanical power delivered by compressor 14.

Finally, the operation of the turbocharger 12 occurs with high energy efficiency because the mechanical power transfer from turbine 13 to compressor 14 occurs directly (by means of the electrical machine 15 which works as an electromagnetic joint) and thus with an efficiency close to one unit.

The invention claimed is:

1. A turbocharger for a supercharged internal combustion engine, the turbocharger comprising:
    a turbine, which is provided with a shaft mounted in a rotatory manner and which is configured to be connectable to an exhaust duct, so as to rotate under the thrust of the exhaust gases;
    a compressor, which is provided with a shaft mounted in a rotatory manner and which is configured to be connectable to an intake duct, so as to increase the pressure of the air fed by the intake duct; and
    a single electrical machine, which is interposed between the turbine and the compressor;
    wherein the shaft of the turbine and the shaft of the compressor are mechanically independent in that they do not have any mutual mechanical connection, and therefore are free to freely rotate with respect to each other; and
    wherein the electrical machine comprises a first rotor, which is mechanically connected to the shaft of the turbine, and a second rotor, which is mechanically connected to the shaft of the compressor to work as an electromagnetic joint between the shaft of the turbine and the shaft of the compressor;
    wherein the turbocharger is configured such that the electrical machine is free from any stator and a first rotor of the electrical machine comprises a winding, which is electrically fed with a system of multi-phase currents by an external electronic control device, which is arranged in a fixed position.

2. A turbocharger according to claim 1, wherein, besides working as an electromagnetic joint between the shaft of the turbine and the shaft of the compressor, the electrical machine is configured to also be capable of working as an electrical generator, so as to convert part of the mechanical power supplied by the turbine into electrical power, or to also be capable of working as an electrical motor, so as to supply mechanical power to the compressor.

3. A turbocharger according to claim 1, wherein the shaft of the turbine and the shaft of the compressor are coaxial to each other.

4. A turbocharger according to claim 1, wherein a second rotor of the electrical machine has permanent magnets and comprises a plurality of permanent magnets, that form corresponding magnetic poles.

5. A turbocharger according to claim 1, wherein the electrical machine comprises a connection device, which establishes the electrical connection between a fixed part and a rotating part, so as to obtain an electrical connection between the electronic control device, which is fixed, and the winding, which rotates together with the corresponding rotor.

6. A turbocharger according to claim 1, wherein the two rotors are inserted into each other.

7. A turbocharger according to claim 1, wherein the two rotors are arranged side by side.

* * * * *